(No Model.)
F. A. WILMOT.
ATTACHING KNOBS TO SHANKS.
No. 482,952.  Patented Sept. 20, 1892.
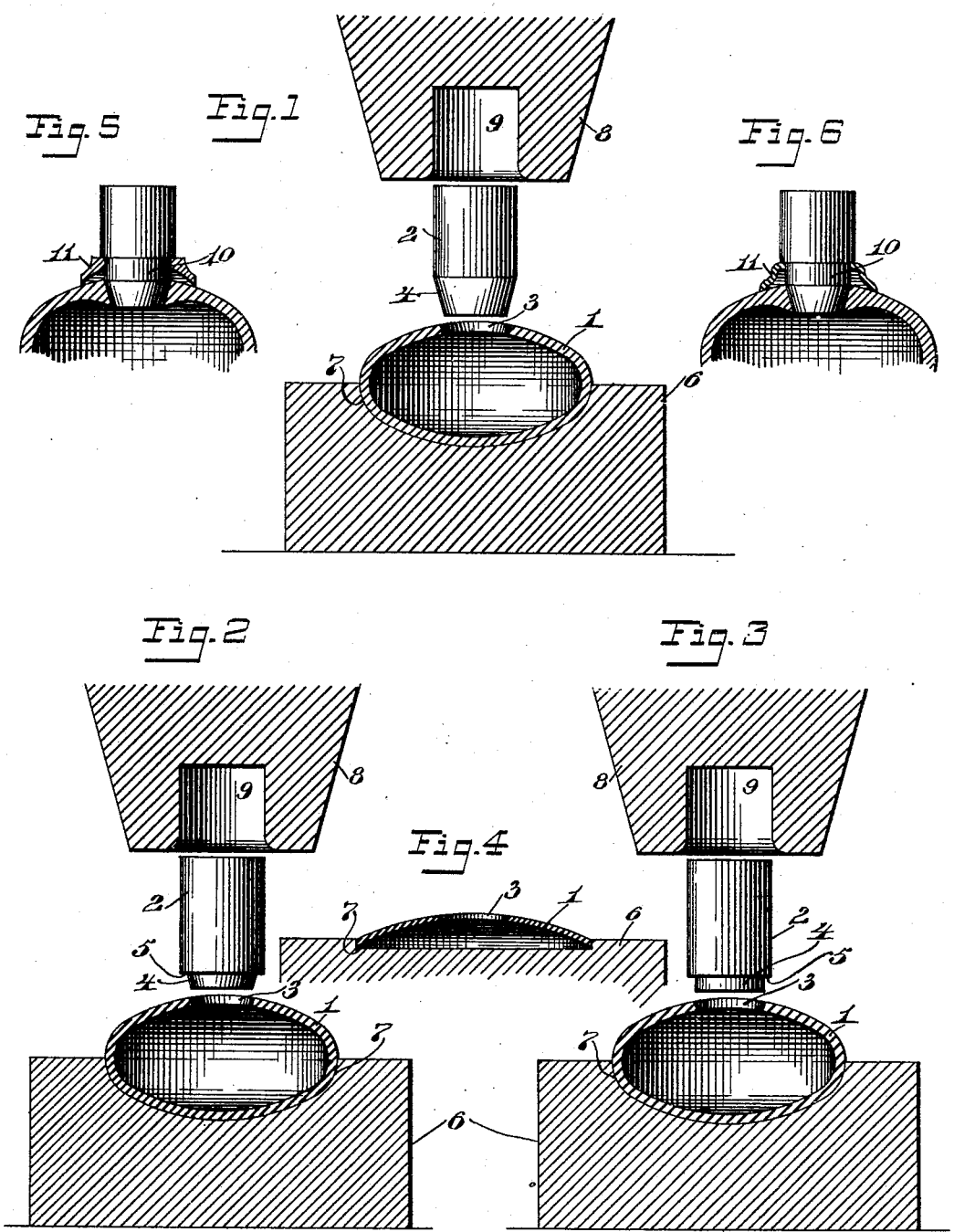
WITNESSES
C. M. Gallaher
Edith G. Ely.
INVENTOR
Frank A. Wilmot
By A. M. Wooster
Atty.

UNITED STATES PATENT OFFICE.

FRANK A. WILMOT, OF BRIDGEPORT, CONNECTICUT, ASSIGNOR TO THE WILMOT & HOBBS MANUFACTURING COMPANY, OF SAME PLACE.

ATTACHING KNOBS TO SHANKS.

SPECIFICATION forming part of Letters Patent No. 482,952, dated September 20, 1892.

Application filed October 26, 1891. Serial No. 409,804. (No model.)

*To all whom it may concern:*

Be it known that I, FRANK A. WILMOT, a citizen of the United States, residing at Bridgeport, in the county of Fairfield and State of Connecticut, have invented certain new and useful Improvements in Attaching Knobs to Shanks; and I do hereby declare the following to be a full, clear, and exact description of the invention, such as will enable others skilled in the art to which it appertains to make and use the same.

My invention relates to attaching knobs to shanks, and has for its object to devise a construction which will permit knobs to be attached to shanks by the process of electric welding without flattening or otherwise distorting the shape of the knob and will give a very strong and perfect weld. With these ends in view I have devised the simple and novel construction of knob and shank and the method of attaching the same, which I will now describe, referring by numbers to the accompanying drawings, forming part of this specification, in which—

Figures 1, 2, and 3 are sectional views illustrating the construction of a knob and shank and the method of attaching the same, the shape of the shanks differing slightly in the several views; Fig. 4, a sectional view of a modification, showing a disk instead of a knob in position in the lower holder; and Figs. 5 and 6 are sectional views of other modifications in which the shoulder is a short distance above the incline, a collar being interposed between the face of the knob and the shoulder.

1 denotes the knob, and 2 the shank. The knob is made convex on its outer side, as clearly shown, and is provided with an opening 3, which receives the reduced end 4 of the shank. In Fig. 1 the reduced end 4 of the shank is a straight taper of suitable size to enter opening 3 in the knob which receives it. In Figs. 2 and 3 I have shown a shoulder 5 near the lower end of the shank. In Fig. 2 the reduced end of the shank is tapered slightly, as shown, so that when the two parts are pressed together the reduced end of the shank will fit closely in the opening in the knob, and shoulder 5 will rest against the outer surface of the knob. Substantially the same construction is shown in Fig. 3, the only difference being that the reduced end of the shank is made straight-sided, the opening in the knob which receives it being preferably tapered. 6 denotes a holder made of suitable shape and size to receive the knob. This holder also serves as an electrical conductor and is ordinarily made of copper, the said holder being provided with a recess 7 of suitable shape and size to receive the knob and hold it firmly. 8 denotes a holder having a recess 9 of suitable shape and size to receive the shank. This holder also may serve as an electrical conductor, and for that reason is preferably made of copper.

It is an important feature of my invention that the reduced end of the shank fits closely in the opening in the knob. This construction causes the reduced end of the shank to act on the principle of a wedge or keystone and prevents the knob from collapsing under the heat and pressure of welding. In practice the reduced end of the shank receives the inward pressure of the metal of the knob which surrounds the opening when the knob and shank are forced together by the holders, thereby insuring a complete and thorough weld between the reduced portion of the shank and the edge of the opening in the knob, as well as a complete and thorough weld between the shoulder, where a shoulder is used, and the outer face of the knob. The reduced end of the shank in use insures that the shank shall be centrally located in the knob, and the shoulder when used wholly prevents any flow of metal in the welding operation, which might otherwise form an objectionable bead on the outside around the shank. In practice the reduced end of the shank and the opening in the knob are so proportioned that the end of the reduced portion will just enter the opening. It follows, therefore, that when the parts are pressed together and the current turned on the metal at the reduced end of the shank and the metal of the knob surrounding the opening will be softened and the reduced end of the shank will force its way into the opening until it reaches the shoulder, if used, or until the pressure is relieved. I have not shown means for moving the two combined holders and electrical conductors toward each other, as such operating mechanism forms no portion of my present invention. In practice I preferably raise the holder carrying the knob vertically. Having placed the knob and shank contiguous to each other in operative position the electrical current is turned on and the operation of welding performed almost instantly.

In Fig. 4 I have illustrated a modified form in which the knob is made from more than one piece of metal, the shank being attached in the same manner as before to a convex plate, to which the rest of the knob may be connected in any suitable manner.

In Figs. 5 and 6 I have illustrated modified forms in which a reduced straight portion 10 is interposed between the tapering end of the shank and the shoulder, and a collar 11, which may either be cast, as in Fig. 5, or struck up from sheet metal, as in Fig. 6, is placed between the shoulder and the knob, thereby improving the appearance of the completed article as well as strengthening the attachment of the knob to the shank, as the electric current when turned on will cause a welding operation to take place both between the collar and the shoulder and between the collar and the face of the knob.

Having thus described my invention, I claim—

The combination, with a knob having a central opening, of a shank having a tapering reduced end adapted to enter said opening and a shoulder surrounding the reduced end which bears upon the face of the knob when assembled, the tapering end acting as a wedge to center the shank and to prevent the knob from collapsing under the heat and pressure of welding, substantially as described.

In testimony whereof I affix my signature in presence of two witnesses.

FRANK A. WILMOT.

Witnesses:
A. M. WOOSTER,
EDITH G. ELY.